United States Patent [19]
Okamura et al.

[11] Patent Number: 5,654,810
[45] Date of Patent: Aug. 5, 1997

[54] LIQUID CRYSTAL DISPLAY APPARATUS WITH A PARTICULAR MICROLENS ARRAY

[75] Inventors: Toshiro Okamura; Seiichiro Tabata, both of Hino, Japan

[73] Assignee: Olympus Optical Co., Ltd., Tokyo, Japan

[21] Appl. No.: 319,604

[22] Filed: Oct. 7, 1994

[30] Foreign Application Priority Data

Oct. 8, 1993 [JP] Japan .................... 5-253061

[51] Int. Cl.⁶ .................. G02F 1/1335; G02F 1/13
[52] U.S. Cl. .................. 349/5; 349/57; 349/112
[58] Field of Search .................. 359/40, 41, 69

[56] References Cited

U.S. PATENT DOCUMENTS

| | | | |
|---|---|---|---|
| 5,046,827 | 9/1991 | Frost | 359/69 |
| 5,365,354 | 11/1994 | Jannson | 359/599 |
| 5,465,175 | 11/1995 | Woodgate | 359/41 |
| 5,471,327 | 11/1995 | Tedesco | 359/15 |

FOREIGN PATENT DOCUMENTS

| | | | |
|---|---|---|---|
| 9204026 | 11/1984 | Japan | 359/40 |
| 1284731 | 12/1986 | Japan . | |
| 3-242603 | 10/1991 | Japan . | |
| 472221 | 6/1992 | Japan . | |
| 5134252 | 5/1993 | Japan | 359/40 |
| 5313154 | 11/1993 | Japan | 359/40 |
| 6167697 | 6/1994 | Japan | 359/40 |

*Primary Examiner*—William L. Sikes
*Assistant Examiner*—Tiep H. Nguyen
*Attorney, Agent, or Firm*—Cushman, Darby & Cushman IP Group of Pillsbury Madison & Sutro LLP

[57] ABSTRACT

A liquid crystal display apparatus designed so that the viewing angle dependence is minimized without causing the displayed image to become unsharp. The liquid crystal display apparatus has a display surface (16) for displaying an image by a plurality of pixels, and a backlight (11) disposed at a side of the apparatus which is reverse to the display surface (16) to allow an approximately parallel light beam, which is approximately normal to the display surface (16), to enter each pixel of the display surface. A microlens array (20) is disposed at the viewing side of the display surface (16), and a diffusing element (21) is disposed in the vicinity of a surface conjugate with the display surface (16) which is formed by the microlens array (20).

6 Claims, 7 Drawing Sheets

21

LIQUID CRYSTAL DISPLAY APPARATUS WITH A PARTICULAR MICROLENS ARRAY

BACKGROUND OF THE INVENTION

The present invention relates to a liquid crystal display apparatus and, more particularly, to a liquid crystal display apparatus designed so that the viewing angle dependence is minimized without causing the displayed image to become unsharp.

A typical liquid crystal display apparatus has a liquid crystal cell sandwiched between two polarizing plates, in which transmitted light is on/off controlled by controlling an electric field applied to the liquid crystal cell, thereby displaying an image. However, since the viewing angle dependence of the liquid crystal display apparatus is high, the displayed image can be seen only within a specific angle range. Accordingly, the conventional practice is to provide a plurality of recesses and projections on the viewing side the display surface of the liquid crystal display apparatus so as to diffuse light rectilinearly propagated through the liquid crystal layer, thereby reducing the viewing angle dependence [see Japanese Utility Model Application Public Disclosure (KOKAI) No. 04-72221 (1992)].

FIG. 10 is an exploded perspective view of a conventional color liquid crystal display apparatus that uses a twisted nematic (TN) liquid crystal. As shown in the figure, constituent elements are arranged in the following order from the light source side: a light source 1, a polarizing plate 5, a glass plate 6, an electrode plate 9, a liquid crystal layer 7, an electrode plate 9, a glass plate 6, a polarizing plate 5, a color filter 3, and a diffusing member 4 composed of a large number of small transparent projections or recesses. The liquid crystal layer 7 is formed by using a TN liquid crystal, that is, a nematic liquid crystal in which the liquid crystal molecules have been twisted 90°. All the constituent elements except for the light source 1 are laid one on top of another in one unit. Either of the two electrode plates 9 is divided in units of pixels, and the liquid crystal layer 7 is functionally divided into liquid crystal cells corresponding to the divided regions of the electrode plate 9. For each liquid crystal cell, one color filter portion of the color filter 3 is disposed correspondingly.

In the above-described liquid crystal display apparatus, light emitted from the light source 1 is linearly polarized in a predetermined direction by the light source-side polarizing plate 5, and enters the liquid crystal layer 7 where the plane of polarization of the incident light is rotated according to the state of the liquid crystal layer 7. That is, when no voltage is applied to the liquid crystal layer 7, the liquid crystal molecules remain twisted 90°. Then, the light having the plane of polarization rotated according to the twist of the liquid crystal layer 7 reaches another polarizing plate 5. In a case where the transmission axis of this polarizing plate 5 is perpendicular to that of the light source-side polarizing plate 5, the light passes through the polarizing plate 5 and reaches the diffusing member 4 through the color filter 3. At the diffusing member 4, the light is diffused to some extent by a large number of small transparent projections or recesses, thereby enabling the viewing angle to be enlarged. Thus, the viewing angle dependence of the liquid crystal display apparatus decreases. It should be noted that in a case where the two polarizing plates 5 are disposed with their transmission axes perpendicularly intersecting each other as described above, when a voltage is applied to the liquid crystal layer 7, the major axes of the liquid crystal molecules are aligned approximately perpendicular to the liquid crystal layer 7. Consequently, the incident light passes through the liquid crystal layer 7 without rotation of the plane of polarization, and hence it is blocked by the second polarizing plate 5. Thus, the portion where the light is blocked is displayed as a dark. It should be noted that the configuration of each projection or recess of the diffusing member 4 may be either a convex lens configuration as shown, for example, in the perspective and sectional views of FIGS. 11(A) and 11(B), or a convex lens configuration as shown in the perspective and sectional views of FIGS. 11(C) and 11(D).

In the above-described arrangement, however, a glass plate 6 that sandwiches the liquid crystal layer 7 in cooperation with another glass plate 6 is present between the liquid crystal layer 7 and the diffusing member 4. Since the glass plate 6 has a thickness, the diffusing surface of the diffusing member 4 must be disposed apart from the liquid crystal layer 7. Consequently, the displayed image becomes unsharp owing to the diffusing member 4 disposed apart from the display surface.

SUMMARY OF THE INVENTION

In view of the above-described problems of the conventional technique, an object of the present invention is to provide a liquid crystal display apparatus designed so that the viewing angle dependence is minimized without causing the displayed image to become unsharp.

To attain the above-described object, the present invention provides a liquid crystal display apparatus having a display surface for displaying an image by a plurality of pixels, and a backlight disposed at a side of the apparatus which is reverse to the display surface to allow an approximately parallel light beam, which is approximately normal to the display surface, to enter each pixel of the display surface. In this liquid crystal display apparatus, a microlens array is disposed at the viewing side of the display surface, and a diffusing element is disposed in the vicinity of a surface conjugate with the display surface which is formed by the microlens array.

In the above-described arrangement, the diffusing element may be a diffraction grating. In such a case, the diffraction grating may be a hexagonal grating.

The microlens array may be composed of microlenses each having either a convex [as shown in FIGS. 11(C) and (D)] or a concave [as shown in FIGS. 11(A) and 11(B)] provided on a polygonal base.

Thus, in the present invention, a microlens array is disposed at the viewing side of the display surface, and a diffusing element is disposed in the vicinity of a surface conjugate with the display surface which is formed by the microlens array. Accordingly, the viewing angle dependence of the liquid crystal display apparatus can be minimized without causing the displayed image to become unsharp. Further, the pixels can be made inconspicuous by disposing the diffusing element slightly apart from the above-described conjugate surface.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The liquid crystal display apparatus of the present invention will be described below by way of embodiments and with reference to the accompanying drawings.

Figure 1:
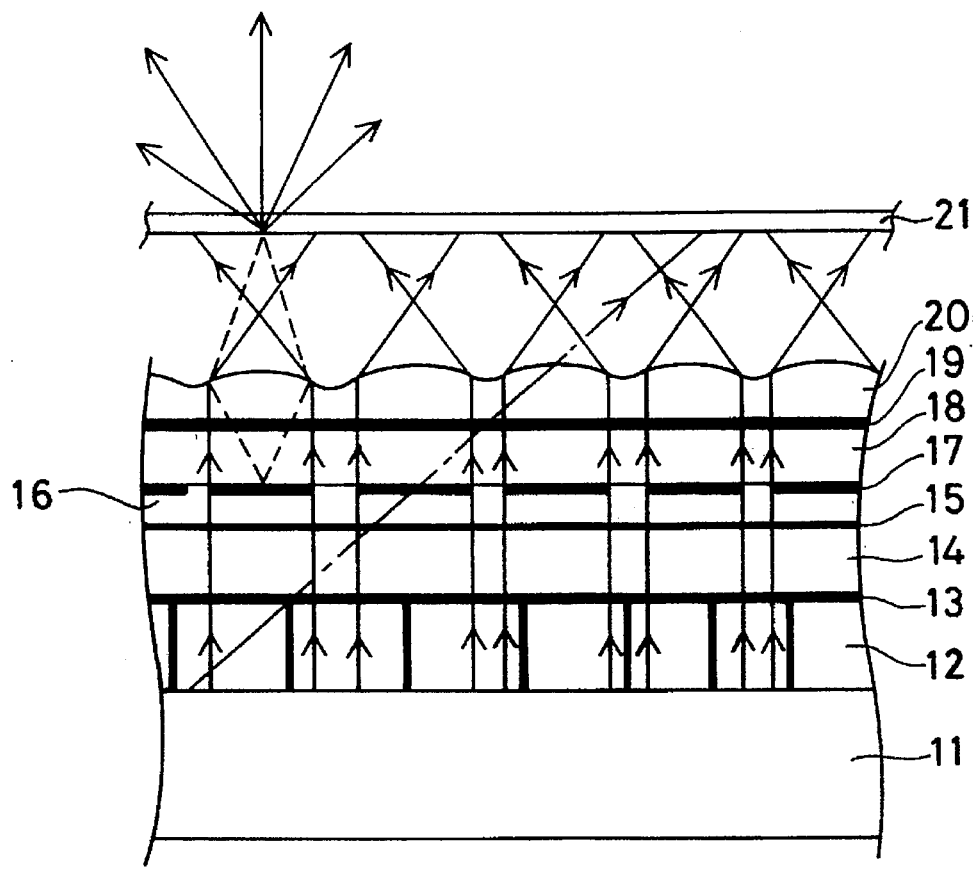
FIG. 1 is a sectional view of one embodiment of the liquid crystal display apparatus according to the present invention.

FIG. 1 is a sectional view of one embodiment of the liquid crystal display apparatus according to the present invention. The present invention is based on the principle that a microlens array is disposed on the display surface of a liquid crystal display apparatus, and a diffusing plate is disposed in the vicinity of an image surface of the pixel display surface which is formed by the microlens array, that is, a surface conjugated with the pixel display surface, thereby preventing the displayed image from becoming unsharp. Referring to FIG. 1, the liquid crystal display apparatus of this embodiment has constituent elements arranged in the following order from the backlight side: a backlight 11, a louver 12, a polarizing plate 13, a cover glass 14, a transparent electrode 15, a liquid crystal layer 16, a transparent electrode 17, a cover glass 18, a polarizing plate 19, a microlens array 20, and a diffusing plate 21. The constituent elements from the backlight 11 to the microlens array 20 inclusive may be arranged together in one unit, but the diffusing plate 21 is disposed apart from the microlens array 20. The microlens array 20 is disposed so that the microlenses thereof are aligned with the liquid crystal cells, respectively.

In the above-described arrangement, light from the backlight 11 is passed through the louver 12 where the numerical aperture is reduced to a certain extent. Then, the light enters the liquid crystal layer 16 through the polarizing plate 13, the cover glass 14 and the transparent electrode 15. The light emerging from the liquid crystal layer 16 reaches the microlens array 20 through the transparent electrode 17, the cover glass 18 and the polarizing plate 19. Thus, an image of each display pixel is formed by the corresponding microlens at a position apart from it by the conjugate distance, as shown by the dotted line. In other words, an image displayed on the liquid crystal layer 16 is formed at a position slightly distant from it. Since the image is formed of only the rays of light which are incident approximately normal to the liquid crystal layer 16, the contrast of the image is high. However, it cannot be seen from a direction deviating from the normal.

Therefore, the diffusing plate 21 is disposed on the conjugate surface, where the displayed image is formed, to diffuse the display light of high viewing angle dependence at a wide angle as illustrated in the figure, thereby minimizing the viewing angle dependence. Moreover, since the surface where the diffusing plate 21 is disposed is in conjugate relation to the pixel display surface, the displayed image will not become unsharp. It should be noted that the diffusing plate 21 may adopt any form of diffusing element, for example, a glass plate whose surface has been merely ground, or a diffusing member composed of recesses or projections as shown in FIGS. 11(A) to 11(D), described in connection with the conventional technique. A diffraction grating having diffraction grating elements of hexagonal or other external shape, which are periodically arranged in a very short cycle with the grating direction varied, as shown in the plan view of FIG. 2, may be used as the diffusing plate 21 even more effectively because the direction of diffused light can be controlled.

Figure 3:
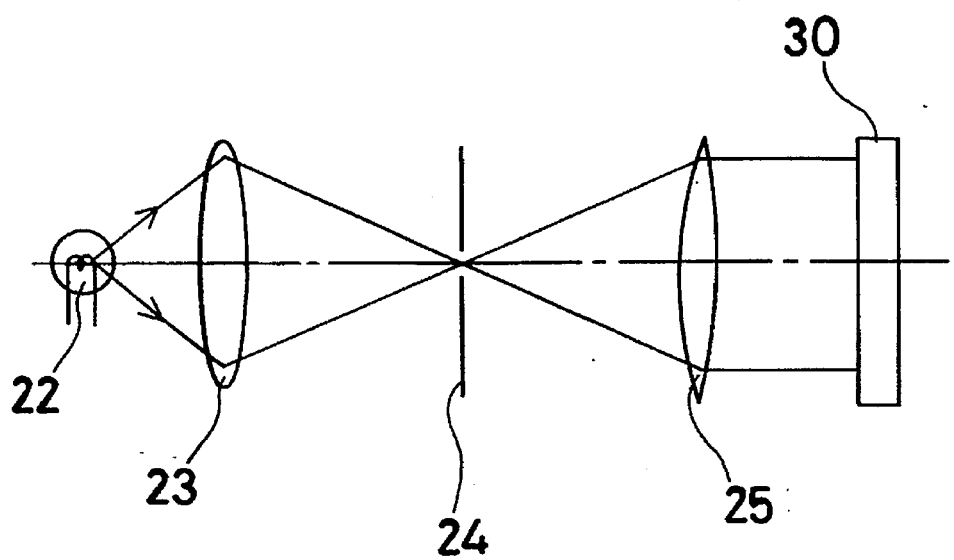
FIG. 3 shows an optical arrangement of one example of an illuminating device used in the present invention.

Illumination by an approximately parallel beam of light, which is made incident approximately normal to the display surface after the numerical aperture has been reduced, may be effected by using an illuminating device as shown, for example, in FIG. 3 in place of the louver 12. In the illuminating device shown in FIG. 3, divergent light from a point light source 22 is focused on a pinhole 24 by a condenser lens 23, and divergent light emanating from the pinhole 24 is passed through a collimator lens 25 to produce a beam of parallel light. The parallel light thus produced is used as back light for a liquid crystal display apparatus 30. Thus, it is possible to use any type of illuminating device as long as the numerical aperture can be reduced to a certain extent. The reason why an approximately parallel light beam which is incident approximately normal to the display surface is used as back light in the present invention is as follows: If an ordinary surface illuminant is used, since there are skew rays as shown by the dashed-and-dotted line in FIG. 1, light from an adjacent liquid crystal cell is undesirably incident on the diffusing plate 21 in addition to the light from the proper cell, resulting in a lowering of the resolution of the displayed image. However, if an approximately parallel light beam is used as described above, there are no skew rays, and there is therefore no likelihood that light from a particular liquid crystal cell will be mixed with light from another cell. Accordingly, the resolution of the displayed image improves.

Figure 4:
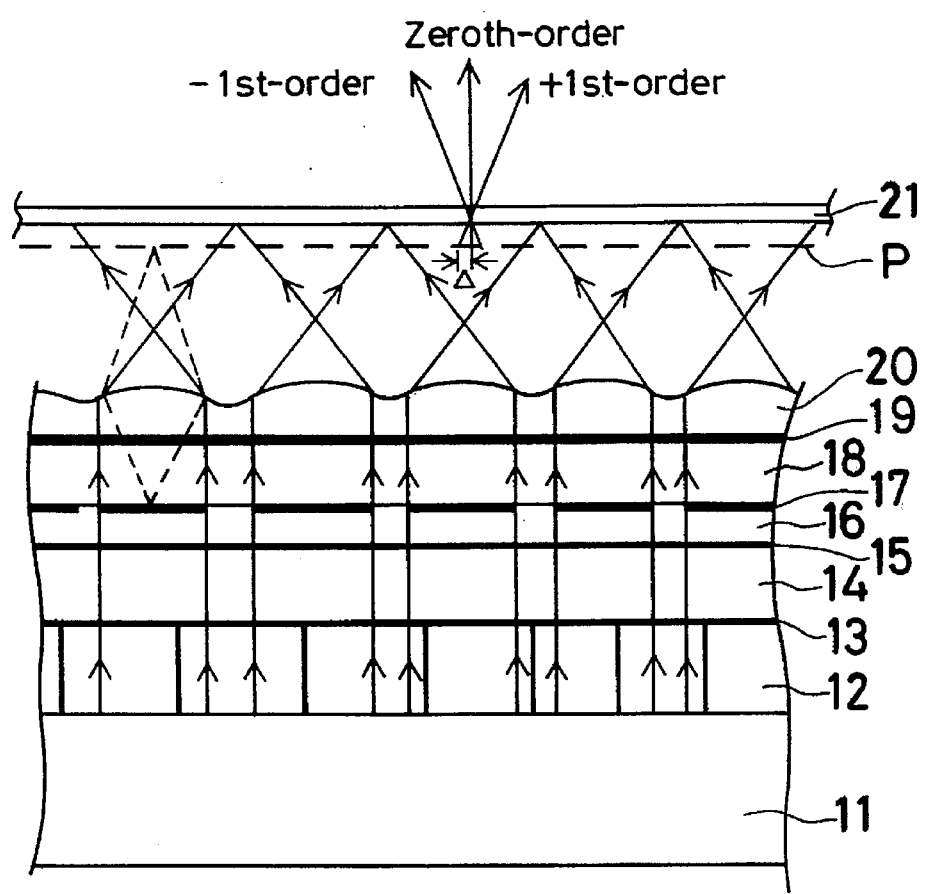
FIG. 4 is a sectional view of another embodiment of the liquid crystal display apparatus according to the present invention.

FIG. 4 shows another embodiment of the liquid crystal display apparatus according to the present invention. In this embodiment, the diffusing plate 21 is disposed slightly away from the imagery plane P of the microlens array 20. Consequently, each individual pixel loses sharpness, and the edge thereof becomes unclear. In addition, each pair of adjacent pixels come in contact with each other owing to the unsharpness, eliminating a dead space from the space between the pixels. Accordingly, the pixels become inconspicuous.

Figure 2:
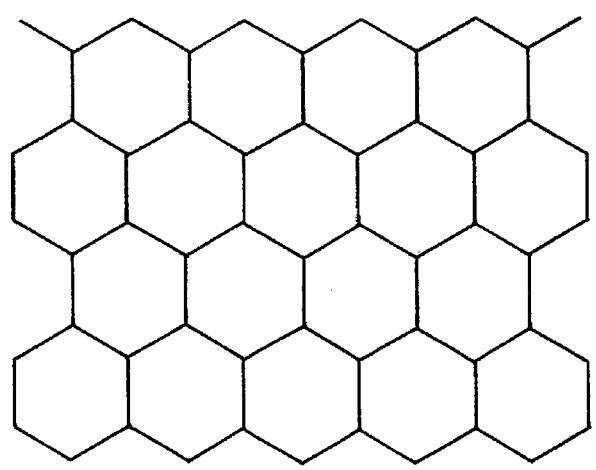
FIG. 2 is a plan view of a diffusing plate that employs a diffraction grating.

If a diffraction grating such as that shown in FIG. 2 is used as the diffusing plate 21 and disposed at a position slightly apart from the imagery plane P toward or away from the microlens array 20, the viewing angle dependence is reduced by the action of higher-order diffracted light. In addition, each pixel is split into a zeroth-order image, a +1st-order image, and a −1st-order image by light of lower-order diffraction that is diffracted by the diffraction grating 21, i.e., zeroth-order diffracted light and ±1st-order diffracted light, so that the ±1st-order images are seen superimposed on the zeroth-order image while being displaced by Δ relative to it, as shown in FIG. 4. Accordingly, if a diffraction grating having a plurality of different grating directions as in the case of FIG. 2 is used as the diffusing plate 21, a large number of ±1st-order images are seen superimposed on the zeroth-order image while being radially displaced relative to it. Accordingly, the high-frequency component of each pixel is cut off. By selecting the amount of displacement Δ so that the dead space between each pair of adjacent pixels is filled with the split images, the border between the display and non-display portions of each pixel, which are bright and dark, respectively, looks blurred, and each pixel becomes inconspicuous. Thus, the display screen becomes correspondingly easier for the observer to see. In addition, the fatigue of the observer's eyes can be reduced.

Although the liquid crystal display apparatus of the present invention has been described above by way of some embodiments, it should be noted that the present invention is not necessarily limited to these embodiments, and that various changes and modifications may be imparted thereto. For example, an array of holograms having image forming ability or Fresnel zone plates may be used in place of the microlens array.

Figure 5:
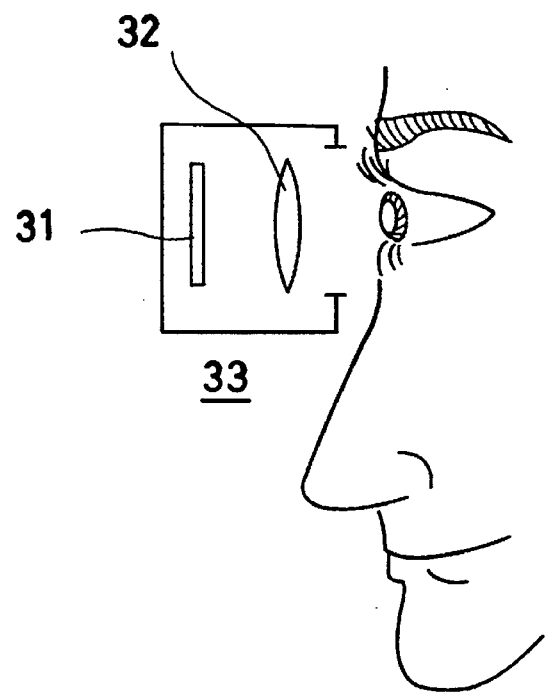
FIG. 5 is a sectional view of one head- or face-mounted image display apparatus that employs the liquid crystal display apparatus of the present invention.
Figure 6:
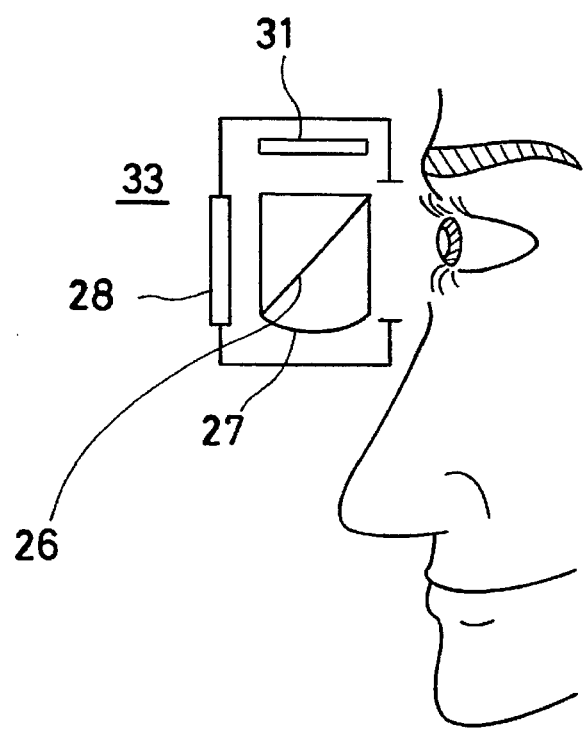
FIG. 6 is a sectional view of another head- or face-mounted image display apparatus that employs the liquid crystal display apparatus of the present invention.

Incidentally, the liquid crystal display apparatus of the present invention is suitable for use as an image display element in a head- or face-mounted image display apparatus (FMD). As shown in the sectional view of FIG. 5, the FMD 33 may be arranged so that a liquid crystal display apparatus 31 according to the present invention can be observed through a positive lens (eyepiece) 32. The FMD 33 may also be arranged as shown in the sectional view of FIG. 6. In the illustrated arrangement, a half-mirror prism 26 is disposed in front of the liquid crystal display apparatus 31 of the present invention, and a concave mirror 27 is disposed to face the liquid crystal display apparatus 31 across the half-mirror prism 26, thereby forming an ocular optical system. In the case of FIG. 6, the liquid crystal display apparatus 31 is disposed at a position where it does not face opposite to the observer's eyeball. Therefore, if a shutter 28 is provided, it is possible to form a see-through FMD which enables the outside world to be also observed.

Figure 7:
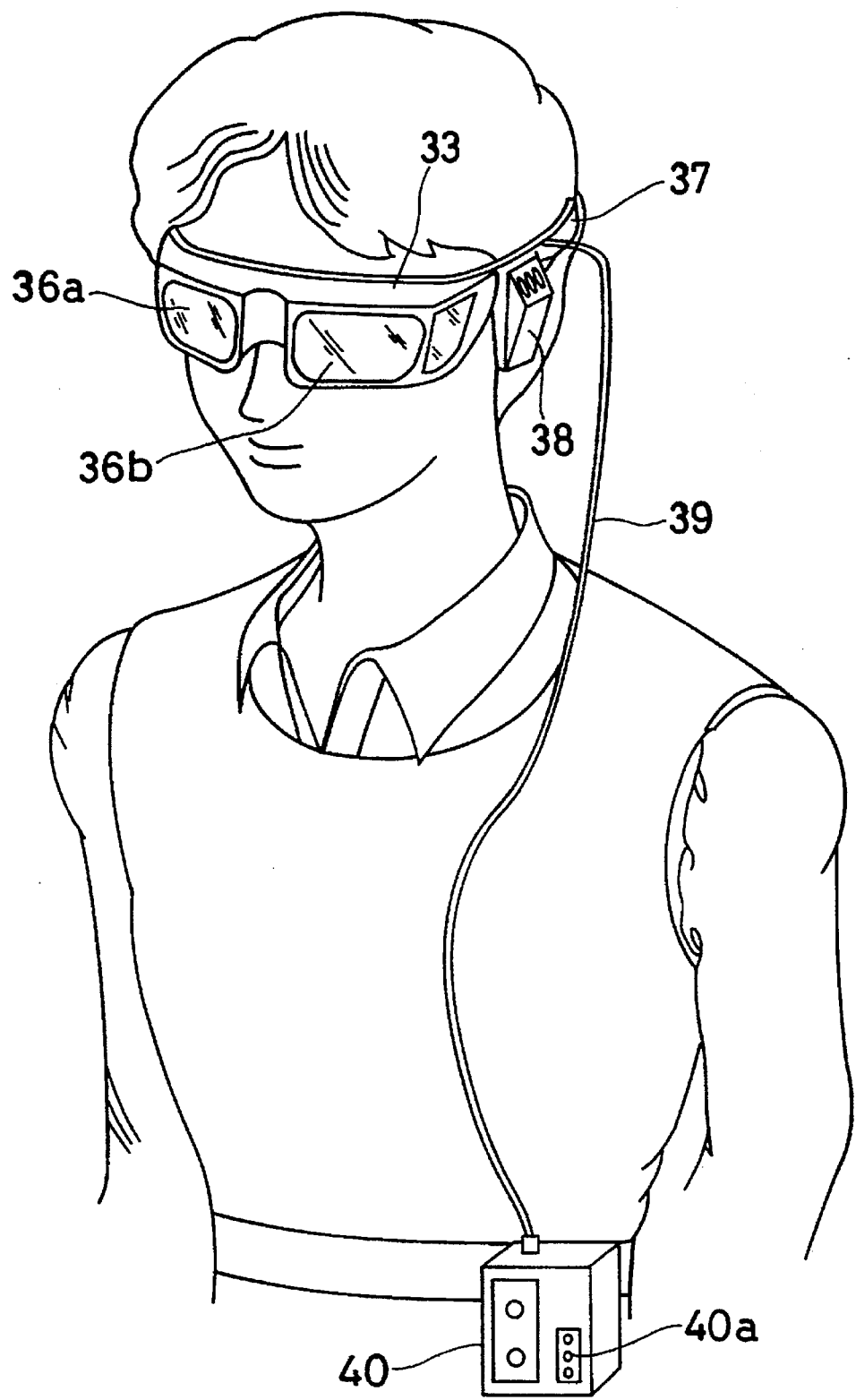
FIG. 7 shows one example of the mode of using a head- or face-mounted image display apparatus arranged as shown in FIG. 5 or 6.

Examples of the mode of using the FMD 33 will be shown below. FIG. 7 shows one example of the mode of using the FMD 33 arranged as shown in FIG. 5 or 6. The FMD 33 has a band 37 attached thereto so that the FMD 33 can be fitted to the observer's head through the band 37. It should be noted that the band 37 as a support member may be arranged such that the condition in which the FMD 33 is fastened to the observer's head can be adjusted by using a screw or other similar member. Alternatively, the support member may be arranged such that a rigid head contact member is adjustably pressed on the observer's head by the pressure of a spring or the like. It is also possible to fasten the FMD 33 to the observer's head by using a rubber band. Any of these arrangements may be selected appropriately.

In addition, a headphone 38 is attached to the band 37 to enable the user to enjoy listening to stereophonic sound in addition to image observation. The FMD 33 having the headphone 38 is connected with a reproducing unit 40, e.g., a portable video cassette unit, through an image and sound transmitting cord 39. Therefore, the user can enjoy not only observing an image but also listening to sound with the reproducing unit 40 retained on a desired position, e.g., a belt, as illustrated in the figure. It should be noted that reference numeral 40a denotes a switch and volume control part of the reproducing unit 40. Reference numerals 36a and 36b denote image display units for the observer's right and left eyes.

Figure 8:
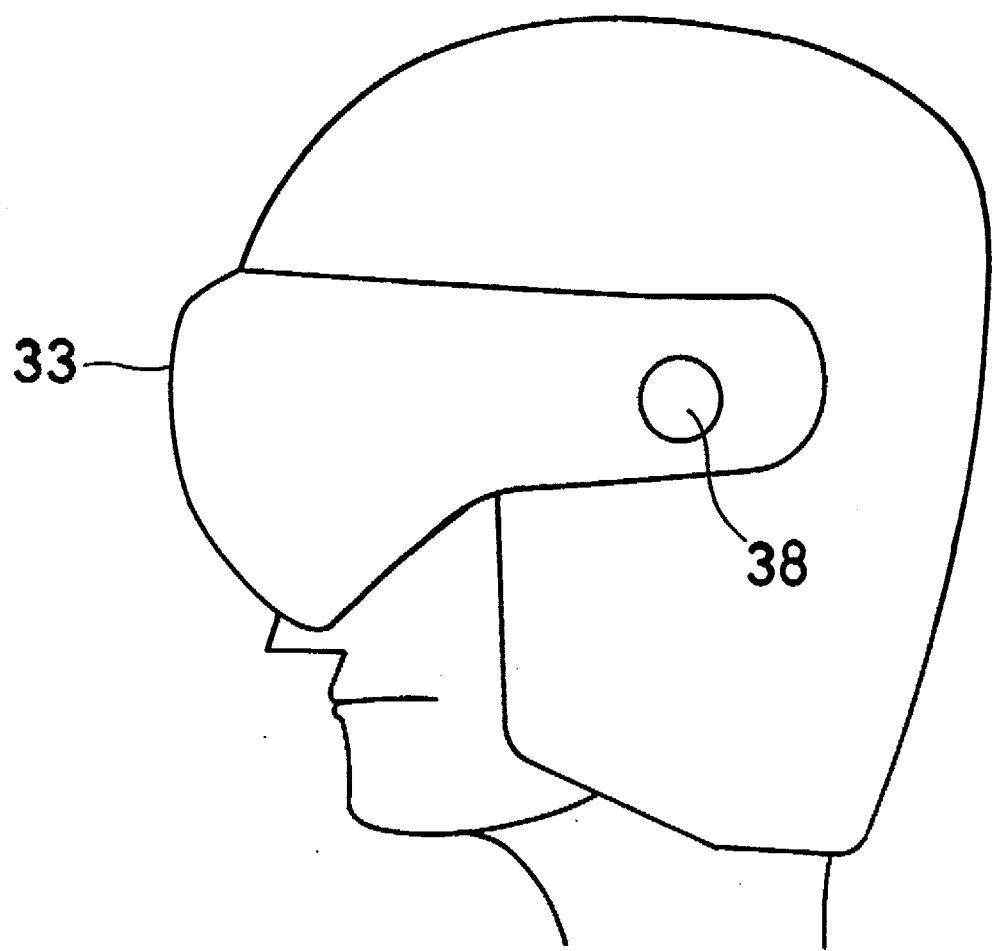
FIG. 8 shows another example of the mode of using a head- or face-mounted image display apparatus arranged as shown in FIG. 5 or 6.
Figure 9A:
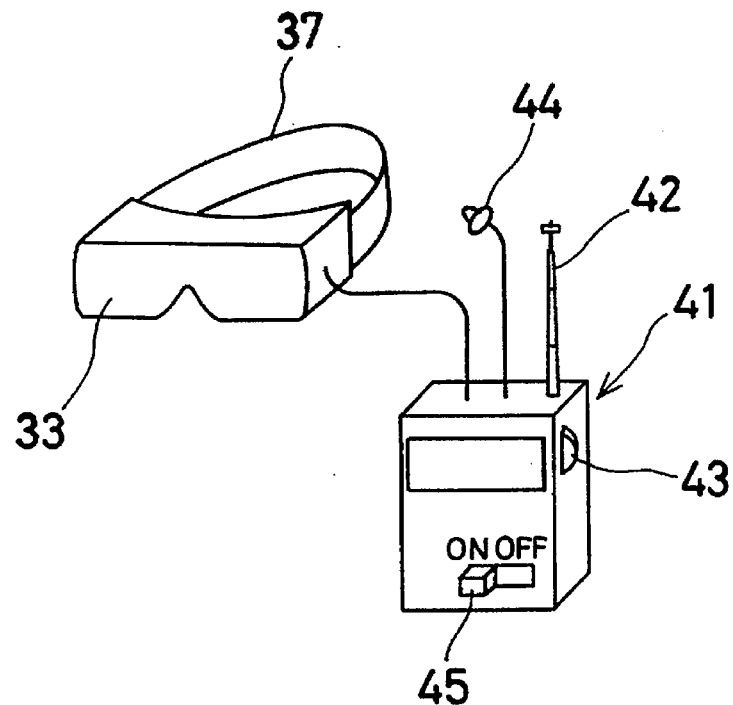
FIGS. 9(A) and 9(B) show other examples of the mode of using a head- or face-mounted image display apparatus arranged as shown in FIG. 5 or 6.
Figure 9B:
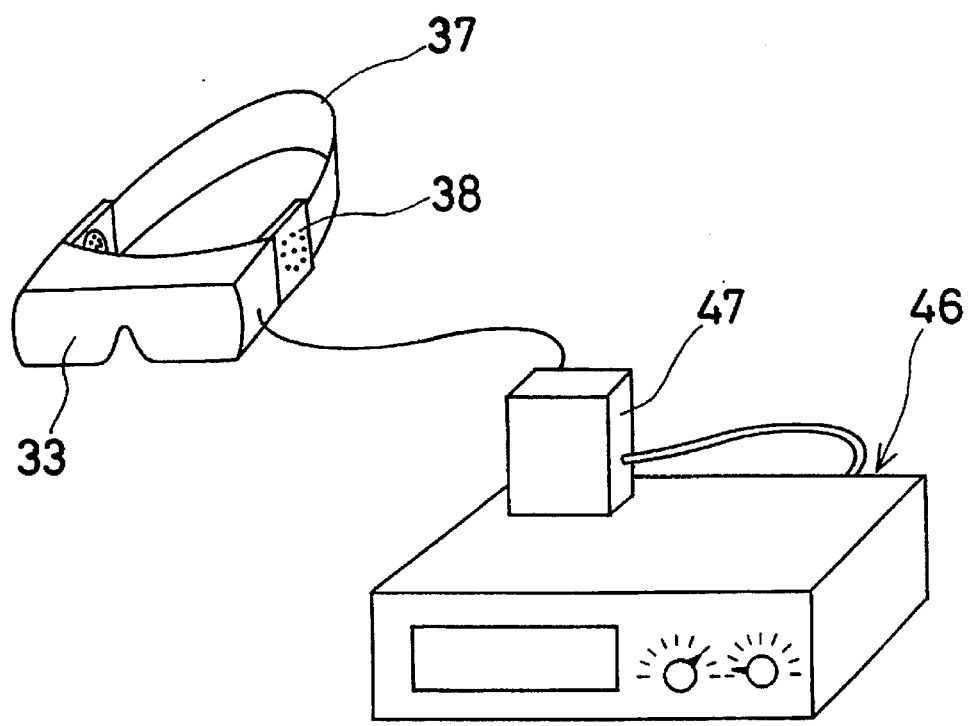
Figure 10:
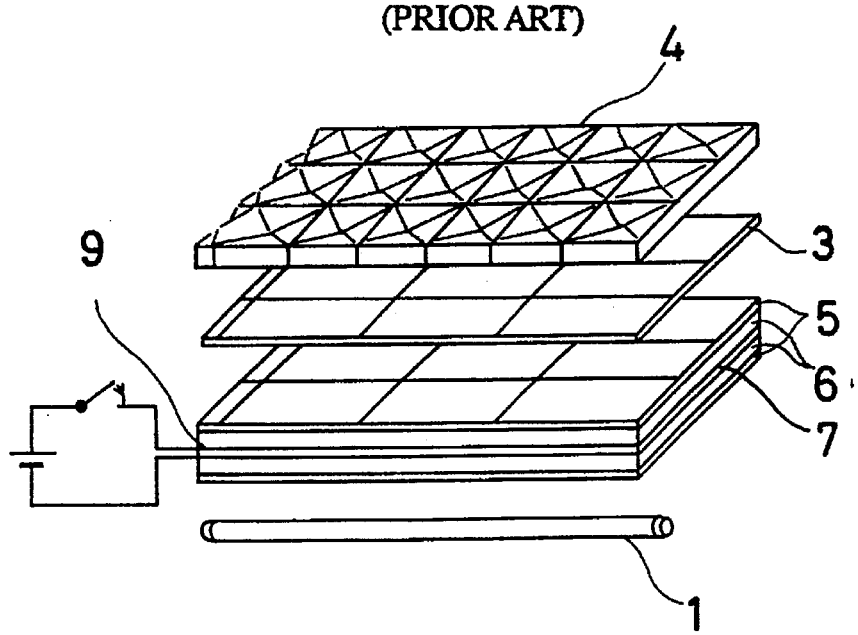
FIG. 10 is an exploded perspective view of a conventional liquid crystal display apparatus.
Figure 11A:
FIGS. 11(A) and 11(B) are perspective and sectional views showing a concave lens configuration in the conventional liquid crystal display apparatus.
Figure 11B:
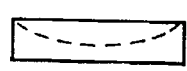
Figure 11C:
FIGS. 11(C) and 11(D) are perspective and sectional views showing a convex lens configuration in the conventional liquid crystal display apparatus.
Figure 11D:

FIGS. 8, 9(A) and 9(B) show other examples of the mode of using the FMD 33. In FIG. 8, the FMD 33 incorporating the liquid crystal display apparatus of the present invention is arranged in the form of a helmet-type image display apparatus. Reference numeral 38 denotes a headphone. Although not shown, a reproducing unit (40) such as that shown in FIG. 7 is connected to the FMD 33 through an image and sound transmitting cord 39, as a matter of course.

FIGS. 9(A) and 9(B) show examples of the mode of using the FMD 33 in combination with a TV tuner or a video deck. FIG. 9(A) shows a combination of the FMD 33 and a TV tuner 41, in which reference numeral 42 denotes a TV signal receiving antenna, 43 a TV channel selecting knob, 44 an earphone, and 45 an ON/OFF switch.

FIG. 9(B) shows a combination of the FMD 33 and a video deck 46, in which reference numeral 47 denotes an image processing device.

As will be clear from the foregoing description, according to the liquid crystal display apparatus of the present invention, a microlens array is disposed at the viewing side of the display surface, and a diffusing element is disposed in the vicinity of a surface conjugate with the display surface which is formed by the microlens array. Accordingly, the viewing angle dependence of the liquid crystal display apparatus can be minimized without causing the displayed image to become unsharp. Further, the pixels can be made inconspicuous by disposing the diffusing element slightly apart from the above-described conjugate surface.

What we claim is:

1. A liquid crystal display apparatus having a display surface for displaying an image by a plurality of pixels, and a backlight disposed at a side of the apparatus which is reverse to said display surface to allow an approximately parallel light beam, which is approximately normal to said display surface, to enter each pixel of said display surface, wherein the improvement comprises:

a microlens array disposed at a viewing side of said display surface; and a diffusing element disposed in the vicinity of a surface conjugate with said display surface which is formed by said microlens array, wherein said diffusing element is a diffraction grating.

2. A liquid crystal display apparatus according to claim 1, wherein said diffraction grating is a hexagonal grating.

3. A liquid crystal display apparatus according to claim 1, wherein said microlens array is composed of microlenses each having a convex surface provided on a polygonal base.

4. A liquid crystal display apparatus according to claim 1, wherein said microlens array is composed of microlenses each having a concave surface provided on a polygonal base.

5. A liquid crystal display apparatus having a display surface for displaying an image by a plurality of pixels, and a backlight disposed at a side of the apparatus which is reverse to said display surface to allow an approximately parallel light beam, which is approximately normal to said display surface, to enter each pixel of said display surface, wherein the improvement comprises:

a microlens array disposed at a viewing side of said display surface; and a diffusing element disposed at a position slightly apart from a surface conjugate with said display surface which is formed by said microlens array, wherein said diffusing element is a diffraction grating.

6. A liquid crystal display apparatus according to claim 5, wherein said position slightly apart from a surface conjugate with said display surface is a position at which an image is formed so as to fill a dead space between the pixels of said display surface.

* * * * *